Dec. 10, 1929.  E. R. SLAGLE  1,739,378
MULTIPLE VALVE
Filed April 13, 1926   3 Sheets-Sheet 1
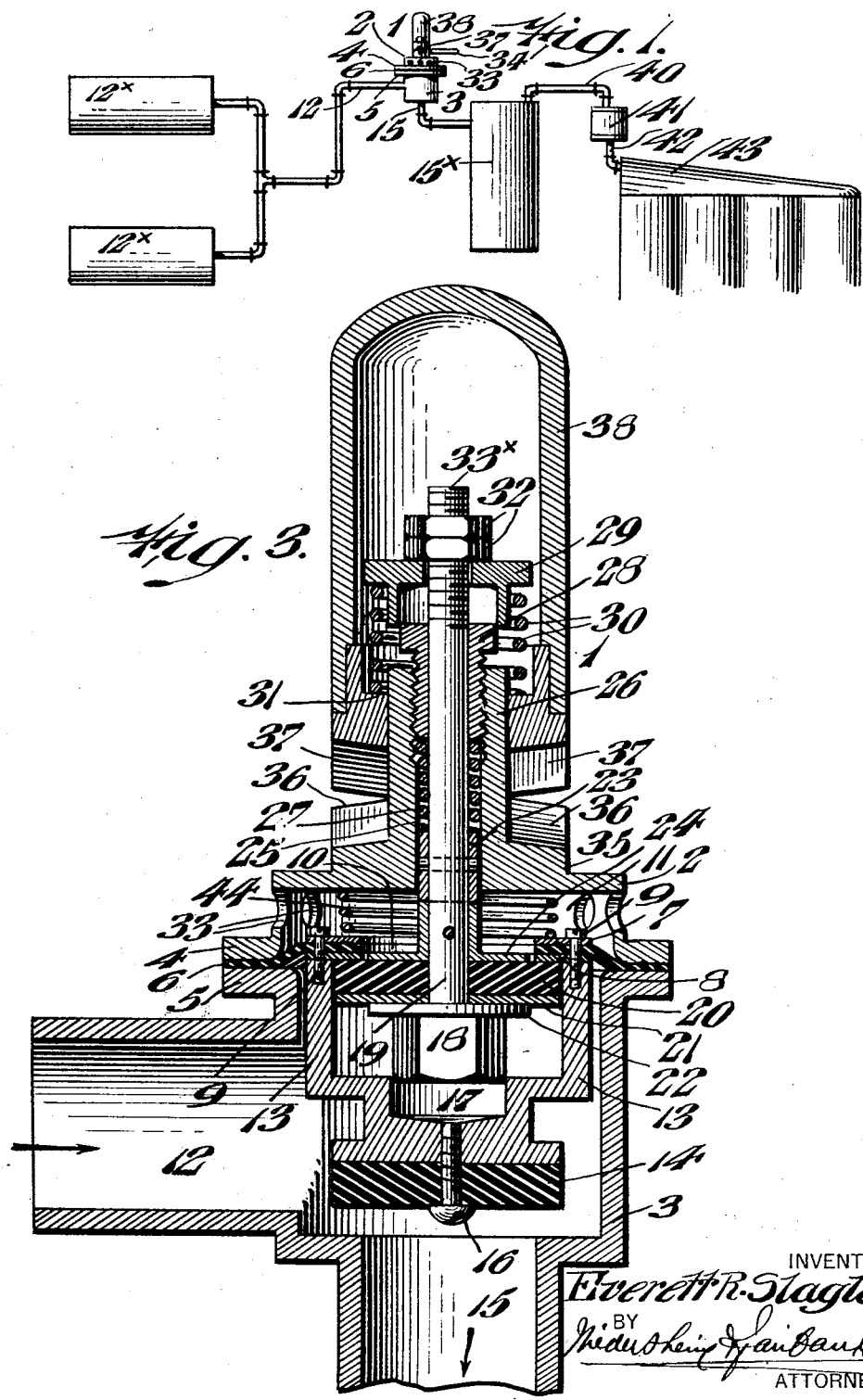

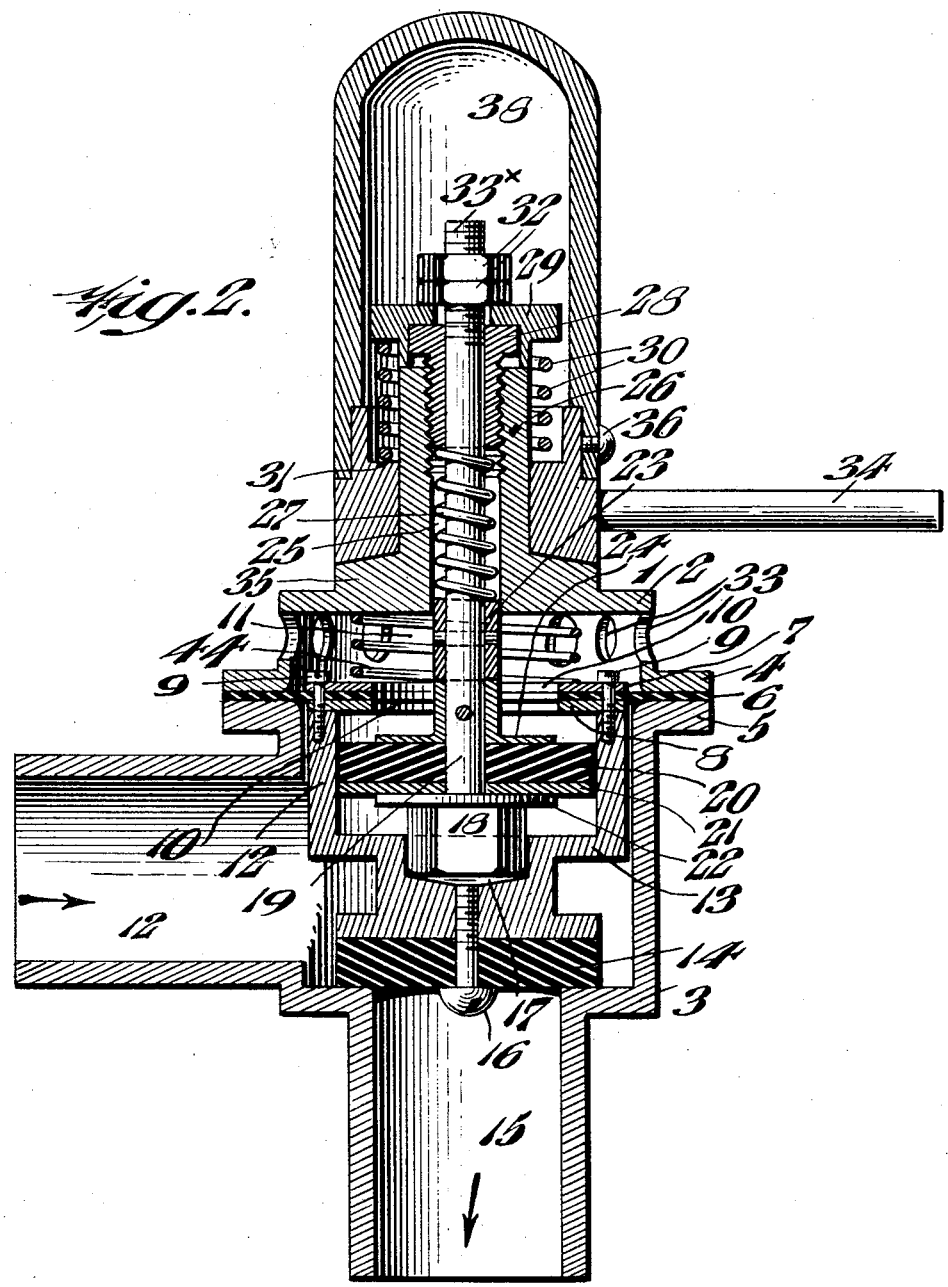

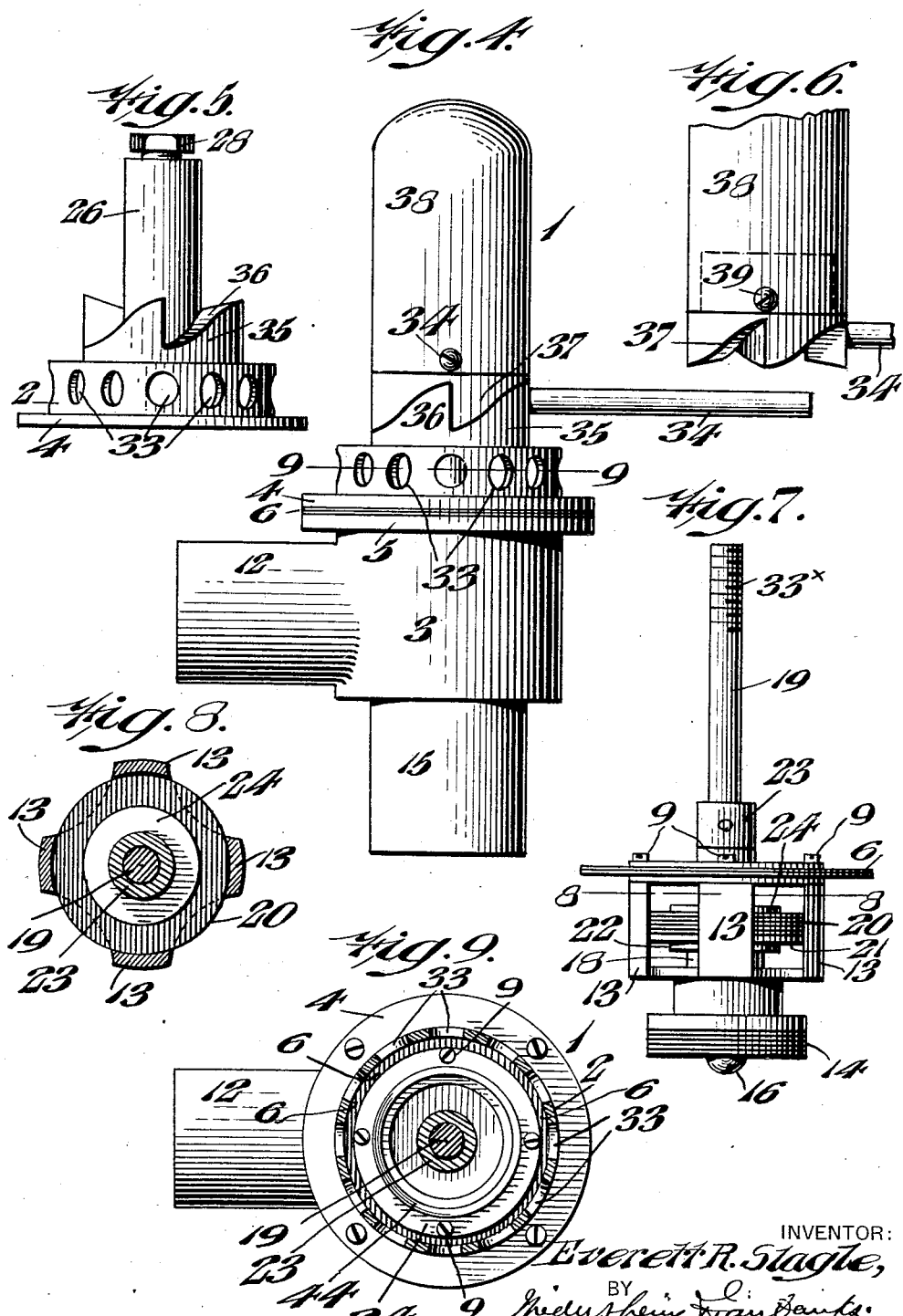

Patented Dec. 10, 1929

1,739,378

UNITED STATES PATENT OFFICE

EVERETT R. SLAGLE, OF SAYRE, PENNSYLVANIA, ASSIGNOR TO STANDARD VACUUM BRAKE CO., OF CAMDEN, NEW JERSEY, A CORPORATION OF NEW JERSEY

MULTIPLE VALVE

Application filed April 13, 1926. Serial No. 101,694.

One object of my invention is to provide a novel valve or means for applying or releasing one or more brake chambers or a moving element therein operated by vacuum, on automobiles, aeroplanes or other self-propelled vehicles or the like.

Another object of my novel valvular construction is to provide a device which will automatically close when a predetermined vacuum has been created in the brake chambers.

Another object is to provide novel means for operating or releasing the brakes or other vacuum actuated devices with a single control, manually or otherwise controlled by the operator.

To the above ends, my invention consists of a novel construction of a multiple valve or control valve, wherein the casing thereof has an inlet in its lower portion from the brake chamber or chambers and a valve controlled outlet to a tank having atmospheric pressure or less, the outer portion of said casing in its upper portion above the release valve having entrance ports leading from the atmosphere through a suitable port or ports controlled by said release valve, whereby when said release valve is open, air at atmospheric pressure may flow past the same to the brake chamber or chambers.

My invention further consists of a novel construction of a valve casing having an application valve and a release valve positioned in the upper portion thereof, provision being made for supporting said application valve by a diaphragm having its outer periphery suitably secured between the sections of the valve casing.

By reason of the above novel construction, I am enabled to have the application valve automatically drawn down against its seat, when the vacuum in the two openings is sufficient to overcome the tension of the operating spring.

It further consists of novel means for operating the valvular elements, and of novel tension devices coacting therewith.

It further consists of a novel construction and collocation of an application valve and a release valve coacting therewith.

For the purpose of illustrating my invention I have shown in the accompanying drawings several forms thereof which are at present preferred by me, since the same have been found in practice to give satisfactory and reliable results, although it is to be understood that the various instrumentalities of which my invention consists can be variously arranged and organized and that my invention is not limited to the precise arrangement and organization of the instrumentalities as herein shown and described.

Figure 1, represents a diagrammatic view of a brake system having my novel multiple valve installed therein.

Figure 2, represents a vertical sectional view of my novel construction of multiple or control valve, certain of the parts being shown in elevation, the application valve being shown seated, and the release valve being shown open.

Figure 3, represents a view similar to Figure 2, but showing the release valve seated, and the application valve unseated.

Figure 4, represents a side elevation, showing the valve casing, and the means for actuating the upper portion thereof.

Figures 5 and 6, represent side elevations of the lower and upper portions of the actuating mechanisms of the valve casing.

Figure 7, represents a side elevation of the application valve, the release valve and its stem and their adjuncts in detached position.

Figure 8, represents a section on line 8—8 Figure 7.

Figure 9, represents a horizontal section on line 9—9 Figure 4.

Similar numerals of reference indicate corresponding parts.

Referring to the drawings:—

1 designates my novel construction of valve, the same comprising the casing composed of the upper and lower sections 2 and 3, which are provided with flanges 4 and 5 respectively, which are secured together by any suitable means the outer periphery of the diaphragm 6 being clamped between said flanges.

The diaphragm 6 has the upper and lower plates 7 and 8 in contact therewith, which are secured together by the screws or other fastening devices 9, there being a port 10 through the middle of said plates and diaphragm whereby communication is had between the upper chamber 11, the interior of the valve casing, and the inlet 12 to the valve casing which leads from the brake chambers 12×, with which said inlet 12 communicates. 44 designates a spring in the chamber 11, which tends normally to retain the diaphragm and its adjuncts in the position seen in Figure 2. The screws 9 not only secure the upper and lower plates 7 and 8 and the diaphragm 6 in assembled position but have their lower ends threaded into the valve body arms 13, which carry at their lower portion the application valve 14 which controls the passage 15 leading to a tank 15× (see Fig. 1) or to any other source of supply having atmospheric pressure or less therein.

The valve 14 is held to the valve body or extension below the arms 13 by means of the screw 16 and said valve body has a recess 17 therein, for the nut 18 which is secured to the bottom of the valve stem 19 of the release valve 20 which is provided with the bottom plate 21 and the washer 22.

23 designates a sleeve for the valve stem 19 which is provided with a bottom flange 24, said sleeve being pinned or otherwise secured to the valve stem 19 of the release valve. The upper end of the sleeve 23 is slidable in the chamber 25 contained within the extension 26 and within the chamber 25 bearing on the top of said sleeve is the spring 27, whose lower end rests upon the top of said sleeve, while its upper end is engaged by the bottom of the hollow adjusting screw 28, which is threaded into the upper portion of the extension 26. The washer 29 has a pendent annular flange surrounding the upper portion of the adjusting screw 28 and bears upon the upper spring 30, whose lower end contacts with the wall 31, whereby said washer 29 and spring 30 can be adjusted by manipulating the nuts 32 on the threaded portion 33× of the stem 19.

In the upper portion 2 of the valve casing, are the inlet ports 33 for the admission of atmospheric air to the interior of the chamber 11, above the release valve 20. 34 designates an operating handle which is suitably secured to the upper housing 38 above the member 35 of the upper casing section 2 which has the stepped or serrated upper edge 36 (see Fig. 5) which coacts with the bottom similarly stepped or serrated portion 37 on the upper housing 38, the latter being rotatably mounted on the member 35.

For convenience in construction, I have shown the housing 38 as separate from the ring carrying the serrated edge 37 but secured thereto by the screw 39, see Figures 2, 4 and 6.

In Figure 1 I have shown the brake chambers diagrammatically as connected to the inlet to the lower valve section 3, by the conduit 12, while the connection 15 leads to the tank 15× having therein atmospheric pressure or less. 40 designates a pipe leading from the tank 15× to the valve casing 41, from which leads the pipe 42 to the point 43, but as the valve, per se, constitutes my present invention, a detailed description of the other coacting elements is unnecessary.

The operation is as follows:—

The parts normally appear as seen in Figure 2. The handle 34 is moved anti-clockwise, which tends to compress the spring 30, which causes the washer 29 to be forced upwardly into the position seen in Fig. 3, which in turn moves the valve stem 19 upwardly compressing the spring 27 until the release valve 20 is brought against the valve seat 8. The vacuum in the opening 15 tends to keep the application valve 14 seated, so that after the release valve is closed, an additional movement must be given to the handle 34, which would compress the spring 30 to a greater extent than seen in Fig. 3, and through the various parts lift the valve body 13 and the valve 14 from its seat, permitting air from the chamber or passage 12 to be drawn into the tank 15× through the opening or passage 15. When the vacuum in the chamber 12 is such as to cause the diaphragm 6 to be drawn down, which in turn moves the valve body and the application valve 14 to a downward position, the application valve 14 will be seated. A still further movement of the handle 34 in the same direction would compress the spring 30 still further, and the operation would be repeated. By moving the handle 34 in a clock-wise direction, the tension of the spring 30 is decreased and the vacuum on the release valve plate 21 would tend to draw the release valve 20 down from its seat into the position seen in Fig. 2 to permit sufficient air to enter through the ports 33, until the vacuum in the chamber 12 again equalizes the tension of the spring 30.

A still further movement of the handle 34 in clock-wise direction would further reduce the spring tension and permit additional air and atmospheric pressure to enter the chamber 12 and a movement of said handle back to its normal position would cause the release valve 22 to entirely unseat as seen in Figure 2 leaving the chamber 12 open to communicate with the atmosphere through the ports 33.

Having thus described my invention, what I claim as new and desire to secure by Letters Patent, is:—

1. In a device of the character stated, a valve casing, a diaphragm therein, having a port therethrough and having its outer periphery secured in said casing, the latter having ports therein leading to the atmosphere above said diaphragm and having a lower inlet and outlet for the supply of air at atmospheric pressure or less, an application valve normally maintained seated by vacuum, said valve being supported from said diaphragm and controlling said outlet, a release valve positioned above said application valve and controlling the port in said diaphragm and a dome-shaped casing having a horizontally projected operating arm, said casing entirely housing said release valve.

2. In a device of the character stated, a valve casing, a diaphragm having its outer periphery secured therein, and a port through the center thereof, an application valve normally maintained seated by vacuum, said valve being supported from said diaphragm and controlling a passage adapted to lead from said casing to a tank containing atmospheric pressure or less, said casing having an inlet passage adapted to lead from brake chambers, a release valve controlling the port in said diaphragm positioned above said application valve and movable independently of the latter, there being ports in said casing above said diaphragm communicating with the atmosphere and a dome-shaped casing having a horizontally projected operating arm, said casing entirely housing said release valve.

3. In a device of the character stated, a valve casing, a diaphragm therein having a port therethrough and having its outer periphery secured in said casing, the latter having ports therein leading to the atmosphere above said diaphragm, and having a lower inlet and outlet for the supply of air at atmospheric pressure or less, an application valve normally maintained seated by vacuum, said valve controlling said outlet, a release valve positioned above said application valve and controlling the ports in said diaphragm, a rotatable dome-shaped housing on the upper portion of said casing and tensioned devices intermediate said housing and release valve for actuating the latter.

4. In a device of the character stated, a valve casing, a diaphragm therein having a port therethrough and having its outer periphery secured in said casing the latter having ports therein leading to the atmosphere above said diaphragm, and having a lower inlet and outlet for the supply of air at atmospheric pressure or less, an application valve normally maintained seated by vacuum, said valve being supported from said diaphragm, controlling said outlet, a release valve positioned above said application valve and controlling the port in said diaphragm, a rotatable housing having a stepped or serrated periphery rotatably mounted on the upper portion of said casing and tensioned devices intermediate said housing and release valve for actuating the latter.

5. In a device of the character stated, a valve casing, composed of upper and lower sections, the lower section having an inlet and outlet for the supply of air at atmospheric pressure or less, and the upper section having ports leading to the atmosphere and having a stepped or serrated periphery, an application valve normally maintained seated by vacuum, said valve controlling said outlet, a diaphragm having a port therein and having its outer periphery secured between said casing sections, a release valve movable independently of said application valve and controlling the port in said diaphragm, a valve stem for said release valve, an upper housing having a stepped or serrated periphery rotatably mounted on the upper valve casing section, and tensioned devices intermediate said upper housing and valve stem for actuating said release valve.

6. In a device of the character stated, a valve casing, composed of upper and lower sections, the lower section having an inlet and outlet for the supply of air at atmospheric pressure or less, and the upper section having ports leading to the atmosphere and having a stepped or serrated periphery, an application valve normally maintained seated by vacuum, said valve controlling said outlet, a diaphragm having a port therein and having its outer periphery secured between said casing sections, a pair of rings between which said diaphragm is fitted, a release valve movable independently of said application valve and controlling the port in said diaphragm, a valve stem for said release valve, an upper housing having a stepped or serrated periphery rotatably mounted on the upper valve casing section, and tensioned devices intermediate said upper housing and valve stem for actuating said release valve.

7. In a device of the character stated, a valve casing, composed of upper and lower sections, the lower section having an inlet and outlet, and the upper section having ports leading to the atmosphere and having a serrated or stepped periphery, an application valve normally maintained seated by vacuum, said valve controlling said outlet, a diaphragm having a port therein and having its outer periphery secured between said casing sections, a pair of rings between which said diaphragm is fitted, a spring arranged between the upper of said rings and a part of the upper casing, a release valve movable independently of said application valve and controlling the port in said diaphragm, a valve stem for said release valve, an upper housing having a stepped or serrated periphery rotatably mounted on the upper valve casing section, and tensioned devices intermediate said upper housing and valve stem for actuating said release valve.

8. In a device of the character stated, a valve casing, composed of upper and lower sections, the lower section having an inlet and outlet for the supply of air at atmospheric pressure or less, and the upper section having an annular chamber the wall of which is apertured entirely therearound having a stepped or serrated periphery, ports leading to the atmosphere, an application valve normally maintained seated by vacuum, said valve controlling said outlet, a diaphragm having a port therein and having its outer periphery secured between said casing sections, a release valve movable independently of said application valve and controlling the port in said diaphragm, a valve stem for said release valve, an upper housing having a stepped or serrated periphery rotatably mounted on the upper valve casing section, and tensioned devices intermediate said upper housing and valve stem for actuating said release valve.

9. In a device of the character stated, a valve casing, composed of upper and lower sections, the lower section having a horizontal inlet and vertical outlet for the supply of air at atmospheric pressure or less, and the upper section having ports leading to the atmosphere and having a stepped or serrated periphery, an application valve normally maintained seated by vacuum, said valve controlling said outlet, a diaphragm having a port therein and having its outer periphery secured between said casing sections, a release valve movable independently of said application valve and controlling the port in said diaphragm, a valve stem for said release valve, an upper housing having a stepped or serrated periphery rotatably mounted on the upper valve casing section, and tensioned devices intermediate said upper housing and valve stem for actuating said release valve.

10. In a device of the character stated, a cylindrical valve casing, composed of upper and lower sections, the lower section having an inlet and outlet for the supply of air at atmospheric pressure or less, and the upper section having ports leading to the atmosphere and having a stepped or serrated periphery, an application valve normally maintained seated by vacuum, said valve controlling said outlet, a diaphragm having a port therein and having its outer periphery secured between said casing sections, a release valve movable independently of said application valve and controlling the port in said diaphragm, a valve stem for said release valve, an upper dome-shaped housing having a stepped or serrated periphery rotatably mounted on the upper valve casing section, and tensioned devices intermediate said upper housing and valve stem for actuating said release valve.

11. In a device of the character described, the combination of a casing, a diaphragm mounted therein, and provided with a port, an application valve carried by the diaphragm, and a release valve controlling the port in the diaphragm.

12. In a device of the character described, the combination of a casing, a diaphragm mounted therein, and provided with a port, an application valve carried by the diaphragm, and a release valve controlling the port in the diaphragm, said release valve being actuated independent of said application valve.

13. In a device of the character described, the combination of a valve casing, a valve mounted therein and having a valve stem, a member mounted on the valve casing for turning movement and adapted to actuate the valve stem and valve, and a cam connection between said member and the valve casing for causing longitudinal movement of the member upon turning the same.

14. In a device of the character described, the combination of a valve casing, a valve mounted therein and having a valve stem, a dome-shaped casing journaled on the valve casing and adapted to actuate the valve stem and valve, and a serrated cam-shaped connection between the dome-shaped casing and the valve casing for causing longitudinal movement of the former upon turning movement thereof.

EVERETT R. SLAGLE.